(No Model.)
2 Sheets—Sheet 1.
E. A. SPERRY.
TROLLEY WIRE SWITCH.
No. 503,443.
Patented Aug. 15, 1893.
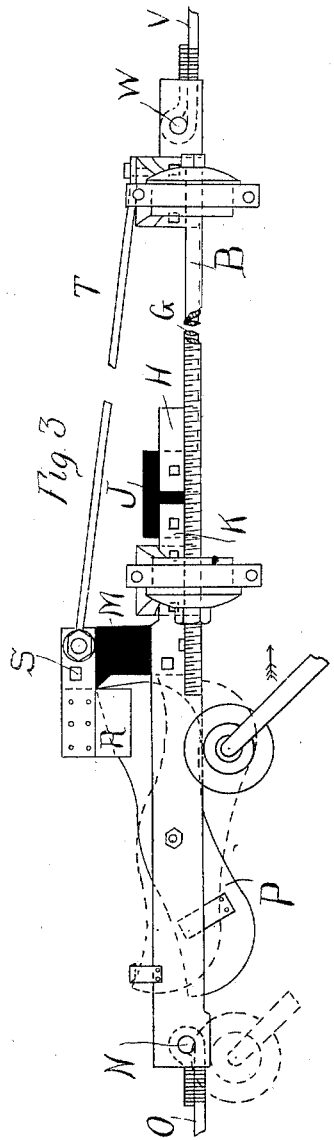
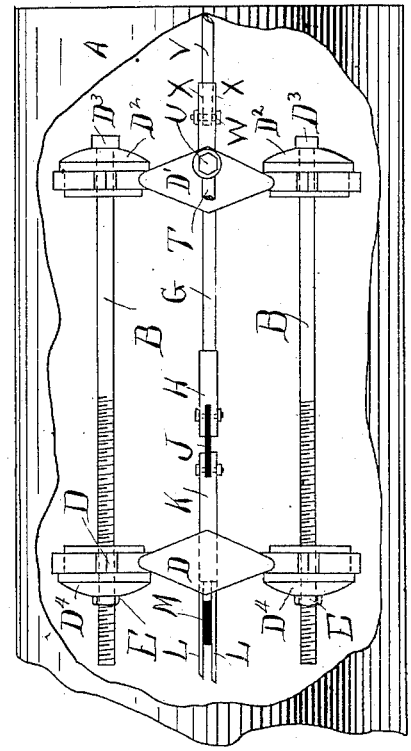
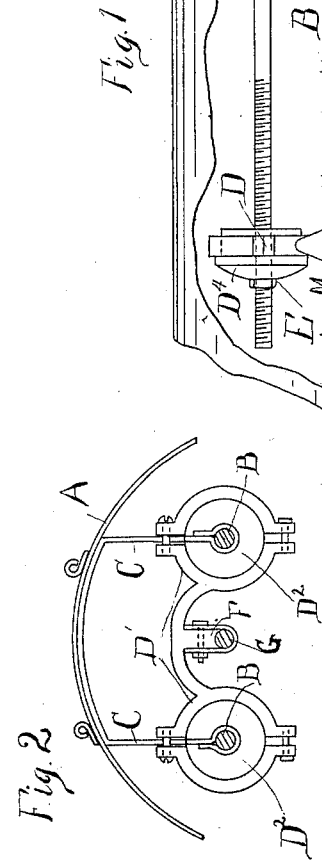
WITNESSES
Walter J. Gunthorp
Julius Taylor
INVENTOR
Elmer A. Sperry
BY Francis W. Parker,
ATTORNEY.

(No Model.) 2 Sheets—Sheet 2.
E. A. SPERRY.
TROLLEY WIRE SWITCH.
No. 503,443. Patented Aug. 15, 1893.
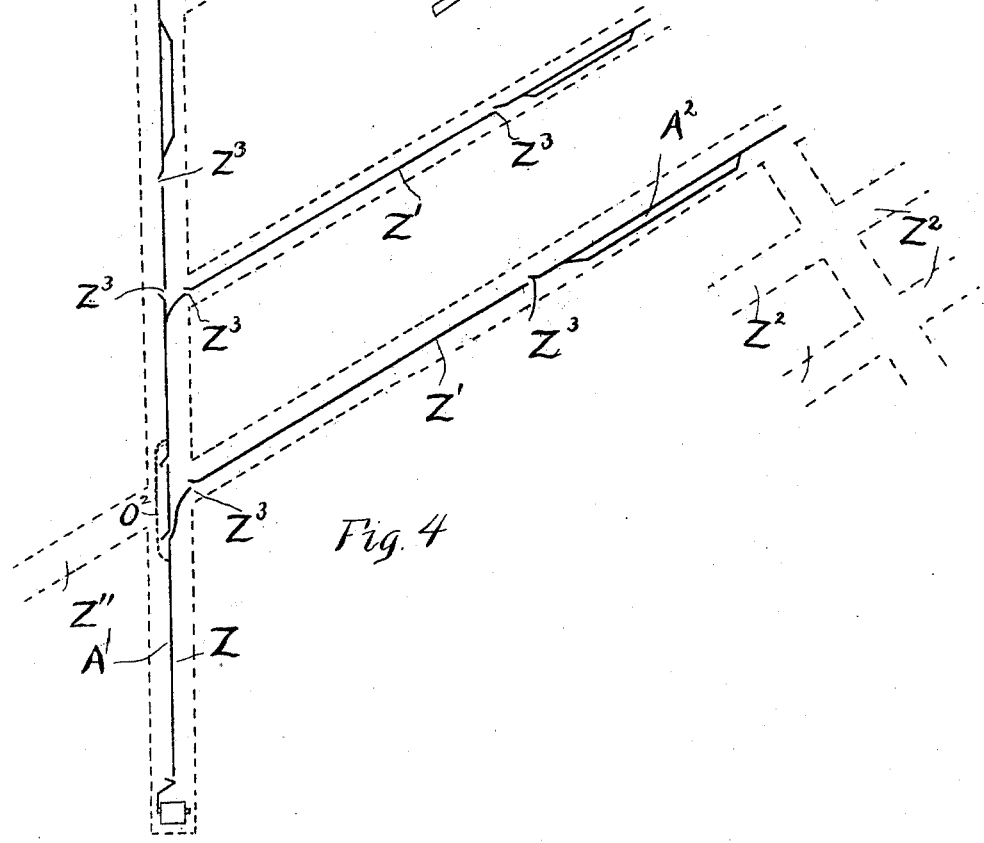
WITNESSES
Walter J. Gunthorp
Julius Taylor
INVENTOR
Elmer A. Sperry
BY Francis W. Parker,
ATTORNEY

UNITED STATES PATENT OFFICE.

ELMER A. SPERRY, OF CHICAGO, ILLINOIS, ASSIGNOR TO THE SPERRY ELECTRIC RAILWAY COMPANY, OF CLEVELAND, OHIO.

TROLLEY-WIRE SWITCH.

SPECIFICATION forming part of Letters Patent No. 503,443, dated August 15, 1893.

Application filed April 1, 1892. Serial No. 427,382. (No model.)

*To all whom it may concern:*

Be it known that I, ELMER A. SPERRY, a citizen of the United States, residing at Chicago, in the county of Cook and State of Illinois, have invented a new and useful Improvement in Switches, of which the following is a specification.

My invention relates to improvements in switches and trolley wire systems for mines, and especially such as are designed to cut sections of trolley wire in and out of circuit for mining work. It is illustrated in the accompanying drawings, wherein—

Figure 1 is a plan view of the switch with parts broken away. Fig. 2 is a cross section. Fig. 3 is a side view. Fig. 4 is a diagrammatic view of a mine. Figs. 5 and 6 are diagrammatic detail views of a modification adapted to cut out sections of the wire.

Like parts are indicated by the same letter in all the figures.

A is a canopy adapted to be suitably supported in position; and B B are screw bolts suspended therefrom by the hangers C C, shown in Fig. 2.

D and D' are yokes. The yoke D' is provided with the insulation pieces $D^2$, which abut against the heads $D^3 D^3$ of the bolts B B.

$D^4 D^4$ are insulation blocks at the ends of the yokes D and they are screw threaded upon the ends of the bolts B B and are provided with the nuts E E, whereby they may be turned to move the yokes D D' with reference to each other. The yokes D D' are provided with ring-shaped portions at their outer ends, which clasp the insulation pieces $D^2 D^4$. The yoke D' is provided with a hanger F whereby the short conductor or trolley wire G is secured to it. This trolley wire is secured at its other end to the block H, which is connected by the insulation piece J to the block K, which is secured to the yoke D and is electrically continuous with the two plates L L. Secured between these plates at one end is the insulation block M, and at the other end the pin N to which the trolley wire O is made fast.

Pivoted between the two plates L L on a bolt is the rocking circuit closer P, adapted to engage the plates R which depend from the block S on the insulation M. From this block S a wire T passes to the yoke D', to which it may be secured by the screw bolt U.

V is one portion of the trolley wire which is secured to the bolt W between the plates X X, which plates are themselves secured in a convenient manner to the hanger D'.

The use and operation of this portion of my invention may properly be described at this point. It is evident that since the yokes are held together by the bolts B B, but are insulated therefrom, there is no electrical connection between them normally. It is equally evident that the trolley wire V and short conductor G are electrically connected at the yoke D', but are normally electrically disconnected from the trolley wire O and the plates L L by reason of the interposition of the block J. Either the trolley wire V or the trolley wire O may therefore be in circuit without the other being in circuit if the circuit closer P is in the position shown in dotted line. The trolley is shown in its dotted line position as approaching the circuit closer P, which is normally in its dotted line position. The trolley will remain in circuit so long as it is at the left of the block J, but as it advances in the direction of the arrow to the position shown in full lines, it will force the circuit closer P up to the position shown in full lines and will cause its end to engage the plates R on the block S, and thus by means of the conductor wire T electrically connect the trolley wire O with the short wire G and the trolley wire V, and thus the trolley will be in circuit until it returns to its normal position, or position of dotted lines, or until it returns to the trolley wire O, when it will again move the circuit closer in the position indicated by the dotted lines, and thus cut out the trolley wire V from circuit.

Referring now to Fig. 4—Z is the main tunnel or passage way of the mine. Z' Z' are leads therefrom to the work; and $Z^2 Z^2$ are heads or rooms in which the work is being done. $Z^3 Z^3$ are the points where the switch hereinbefore described would be located, and thus the switches so located would keep the trolley wire of the section of track on which the motor car is working in circuit while all of the sections of track beyond the point of working will be out of circuit. For example, assuming that the motor car is in the main passage way Z at A', the switches at $Z^3 Z^3$ in the first passage way Z' will be open and the mules may be safely driven through the lead Z' and without danger of being injured by the electric current, since the wire in such lead is out of circuit. Now, when the motor car passes up into this lead it will close the circuit at both points $Z^3$ and put these wires into circuit. Then the empty cars being brought back by the motor will be pushed up on the loop $A^2$ and the motor car will return and take the loaded cars from the other branch of the loop and then pass down the lead Z' successively opening the switches after it so as to leave the conductors or trolley wires about such loop and in such lead out of circuit. This same action will take place in like manner wherever such switch $Z^3$ is located, and the leads not being used by the motor as well as the distant portion of the main passage not in use will all be out of circuit and there will be in circuit only such portions of the trolley wire system as lead from the motor at whatever point it may be located to the generator at the foot of the shaft. In the elaboration of this system it may become necessary to bridge the space across the main channel which connects two leads, or which connects the lead Z' with the passage way Z" through which the mules are driven to their stables or elsewhere. The devices used for accomplishing this purpose are illustrated diagrammatically in Figs. 5 and 6. O and V are the main trolley wires to be connected, and O' is a short conductor or trolley wire, insulated from the other two and suitably supported in position. $O^2$ is a concealed or buried conductor connecting the trolley wires O and V, and the short conductor O' is normally out of circuit. This short conductor is provided at the end with a section $O^3$, which terminates in a contact block $O^4$ in the path of a pivoted circuit closing lever $O^5$, which is associated with a pivoted lock block $O^6$. From one end of the circuit closing lever leads a cord $O^7$ to the opposite lock block.

The use and operation of this portion of the device is as follows: The section O' is normally out of circuit and the trolley wires O and V are kept in circuit by means of the concealed conductor $O^2$. But when the car is moving along that portion of the track which is associated with the short conductor O', it is necessary for the latter to be in circuit. Now it is clear that if the trolley indicated in Fig. 5 be moving in the direction shown in Fig. 5 it will have engaged the projecting end of the right hand lever $O^5$ and will have thrown it up in the position indicated, into which position it will be locked by means of the lock block $O^6$, and this lever will close the circuit between the trolley wire V and the conductor $O^3$ and place the short trolley wire O' in circuit. This action will take place before the trolley engages the conductor O', and when the trolley does engage this conductor it will still be in circuit. As the trolley passes forward it will engage the left hand lever $O^5$ and force it over toward the left, thus drawing upon the cord $O^7$ and lifting the right hand lock block $O^6$ and releasing the right hand lever $O^5$, which will then by gravity resume the position indicated in Fig. 6, thus cutting out the short trolley conductor O'. The same action takes place when the trolley returns, moving in the opposite direction except that the cital of action is reversed.

To summarize, the object, use and operation of my invention are substantially as follows: In mining, where trolley wires and electric motors are used in the main passages and leads, great difficulty and danger results from the use of animals, and especially on account of the contracted character of the drive ways. To obviate this difficulty, I have devised the switch here described, which will successively open up the leads from the main passage when, and only when, the same are in use, to supply current to the motor; and I have also provided the means for throwing in and out the short section of trolley wire which may happen to be so placed as to make it necessary to keep the same out of circuit while the trolley wires on both sides of such section are in circuit. These latter devices diagrammatically illustrated may consist substantially of the same construction as shown in Figs. 1, 2 and 3, with the added feature of the cross connecting cross and lock blocks, and such modifications of the switch proper as might be necessary to cause it to perform the functions diagrammatically suggested in Figs. 5 and 6.

I claim—

1. The combination of a trolley wire divided into sections with a series of switches placed at the opposed ends of successive sections, said switch normally open but adapted to be closed by the trolley when it moves in one direction and to be opened by it when the trolley moves in the other direction, so that all the sections on one side of the trolley are in circuit and all on the opposite side are out of circuit.

2. The combination of successive main sections of trolley wire with short intermediate sections of trolley wire normally out of circuit, short insulated conductors permanently connecting such main sections around such short section and a two part circuit closer associated with such short section and having one part arranged in the path of the trolley wheel, whereby the circuit closer is adapted to throw the short section into circuit when the trolley is moving toward the same, and to throw it out of circuit when the trolley is moving away from it.

3. The combination of successive sections of trolley wire electrically disconnected from each other, with a coupling therefor consisting of parts which grasp the ends of such sections and are adjustably connected together, but insulated from each other and a circuit closing switching device adapted to connect the sections when the trolley moves in one direction, but to disconnect them when the trolley moves in the other direction.

4. The combination of successive sections of trolley wire electrically disconnected from each other with a coupling consisting of parts which grasp each one end of one section, screw rods which connect such parts, but are insulated therefrom, and nuts on such screw rods whereby the parts may be moved to and from each other, and a circuit closing switching device and connector adapted to be operated by the trolley to connect the two sections when the car moves in one direction, and to disconnect them when it moves in the opposite direction.

5. The combination of successive main sections of trolley wire with a short intermediate trolley wire, switches one at each end of such trolley wire, and cross connections from each switch to the other, whereby when the trolley moves toward the short section, one switch is operated to place the short section in circuit, and when the trolley moves from the short section the same switch is operated to cut the section out of circuit.

ELMER A. SPERRY.

Witnesses:
FRANCIS W. PARKER,
WALTER J. GUNTHORP.